(12) United States Patent
van Houten

(10) Patent No.: US 11,060,763 B2
(45) Date of Patent: Jul. 13, 2021

(54) WATER HEATER USAGE PROFILING UTILIZING ENERGY METER AND ATTACHABLE SENSORS

(71) Applicant: Aquanta Inc., Tysons, VA (US)

(72) Inventor: Arnoud Bruins Jan van Houten, Reston, VA (US)

(73) Assignee: Aquanta Inc., McLean, VA (US)

( * ) Notice: Subject to any disclaimer, the term of this patent is extended or adjusted under 35 U.S.C. 154(b) by 300 days.

(21) Appl. No.: 16/025,809

(22) Filed: Jul. 2, 2018

(65) Prior Publication Data

US 2019/0003741 A1    Jan. 3, 2019

Related U.S. Application Data

(60) Provisional application No. 62/527,803, filed on Jun. 30, 2017.

(51) Int. Cl.
*F24H 9/20* (2006.01)
*G05B 15/02* (2006.01)

(52) U.S. Cl.
CPC .......... *F24H 9/2007* (2013.01); *G05B 15/02* (2013.01); *G05B 2219/163* (2013.01); *G05B 2219/25168* (2013.01); *G05B 2219/2642* (2013.01)

(58) Field of Classification Search
CPC ... G01K 3/06; G01K 3/10; G01K 7/16; F24H 9/2007; F24H 9/0005; F24H 1/00; F24H 1/05; F24H 1/18; G05B 15/02; G05B 2219/163; G05B 2219/25168; G05B 2219/2642; F24D 19/1051; G01F 1/6847; G01F 1/6888; G01F 1/6965; G01F 1/7044; G01F 15/005; G01F 15/024; G01F 15/066; G01F 15/0755; G01F 9/001
See application file for complete search history.

(56) References Cited

U.S. PATENT DOCUMENTS

| 8,360,334 B2 | 1/2013 | Nold et al. |
| 8,505,498 B2 * | 8/2013 | Acker ................ F24D 17/0078 122/20 R |
| 9,390,381 B2 | 7/2016 | Davari et al. |

(Continued)

FOREIGN PATENT DOCUMENTS

FR    3029274    * 6/2016

*Primary Examiner* — Catherine T. Rastovski
(74) *Attorney, Agent, or Firm* — Sterne, Kessler, Goldstein & Fox P.L.L.C.

(57) ABSTRACT

The present disclosure relate to a controller system and method for use in storage-style water heating systems that offers significant opportunities for energy saving. The controller system can adjust the water heating system in response to energy demand patterns of user fixtures. The controller system can detect quantity of heated water usage and produce a heated water usage profile. The controller system can determine the quantity or volume of the used heated water without a mechanical flow meter. The controller system can include a cost-effective, accurate, and easy-to-install water temperature sensors that provide measurements of the differentials between water temperatures without direct contact with the water. The water temperature sensors can be cost-effective and easy-to-install sensors that are attached to the water pipes through a strap or other attachment methods.

20 Claims, 9 Drawing Sheets

(56) References Cited

U.S. PATENT DOCUMENTS

| | | | | |
|---|---|---|---|---|
| 2011/0139144 A1* | 6/2011 | Zheng | ............... | F24S 40/60 |
| | | | | 126/588 |
| 2013/0197827 A1* | 8/2013 | Besore | ............... | G01K 17/08 |
| | | | | 702/45 |
| 2014/0026970 A1* | 1/2014 | DuPlessis | ............ | F24H 9/2021 |
| | | | | 137/3 |
| 2018/0274792 A1* | 9/2018 | Shaffer | ............... | F24D 19/1051 |
| 2019/0107293 A1* | 4/2019 | Braier | ............... | F24D 19/10 |

* cited by examiner

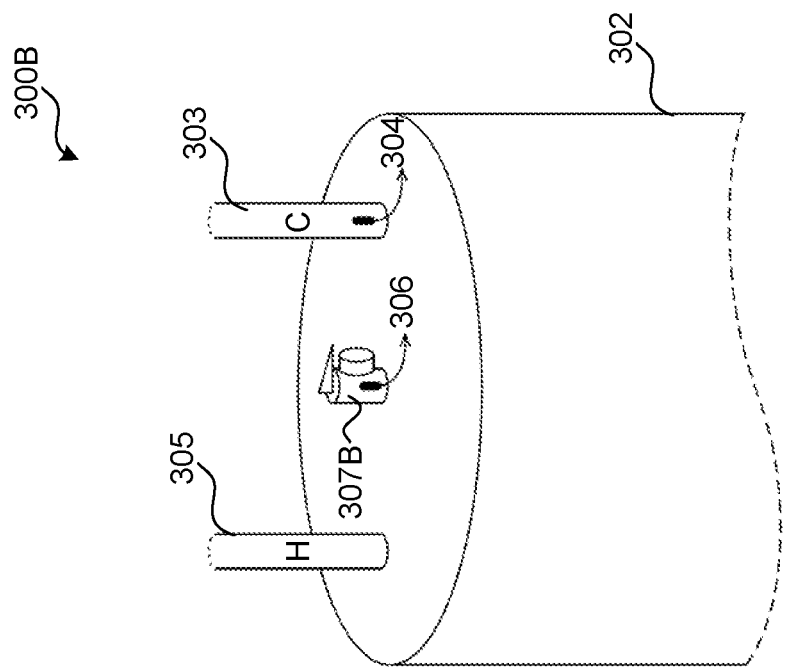
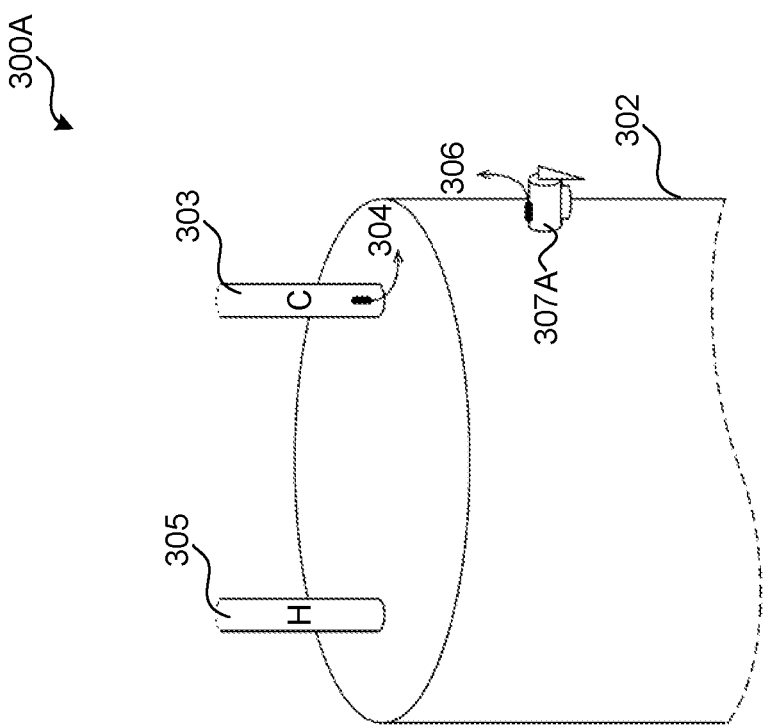
FIG. 3A
FIG. 3B

WATER HEATER USAGE PROFILING UTILIZING ENERGY METER AND ATTACHABLE SENSORS

BACKGROUND OF THE INVENTION

Water heating systems are commonly used in residential and commercial buildings to supply heated water. A water heating system draws cold water from a water supply of the building and stores the water in a reservoir. Heating elements such as immersed electric resistance elements within the reservoir heat the stored water to a desired temperature by converting electrical energy to thermal energy. The heated water stored in the reservoir is held at a desired temperature by the heating elements. The water heating system is connected to a water distribution system of the building and provides heated water through water outlets to building fixtures such as faucets, showers, and dishwashers, etc. The desired temperature is generally a consumer-selected temperature that allows the consumer to receive a certain temperature of heated water at the water outlet. While heated water is removed from the reservoir, the water heating system draws cold water into the bottom of the reservoir and re-heats the cold water to the desired temperature.

Water heating systems consume electric power or burn gas to produce heated water, and a number of energy conservation measures are generally implemented to reduce the energy consumption of water heating systems. For example, insulation material can be placed between the reservoir and the surrounding environment to reduce heat loss. A user can also reduce energy usage by lowering the desired temperature of the heated water through adjusting settings of the thermostat mounted on an outer housing of the water heating systems. Alternatively, during long periods of time when no heated water is needed the user can turn off the water heating systems to reduce energy usage. However, this method requires frequent user intervention and is inconvenient to implement.

Heated water stored in the water heating system is usually maintained at the desired temperature at all times for convenience. Although insulation material can reduce heat dissipation into the surrounding environment, the heated water stored in the reservoir loses heat at an energy loss rate that is dependent upon a number of factors: (i) the heated water temperature; (ii) the ambient temperature; and (iii) the insulating material's resistance to conductive heat flow. This energy loss due to heat dissipation is generally considered as standby loss. Even without productive use of heated water, the water heating system loses energy and periodically requires energy to heat water and maintain the heated water at the desired temperature. The energy loss rate decreases as the difference between the two temperatures decreases, while an insulating material with high thermal resistance can contribute to a low energy loss rate.

As water heating systems are typically the second biggest energy load in residential homes, there is a need to reduce energy consumption of water heating systems. Users typically measure the total energy consumption of water heating systems by monitoring an energy meter that is connected to a power supply of the water heating systems. Thermal energy output of water heating systems is also crucial information as it indicates the amount of heated water actually used by the user. However, monitoring hot water usage and thermal energy output of water heating systems can be challenging. Conventional water heating systems typically attempt to monitor hot water usage and derive thermal energy output by relying on flow rate meters, calibrated calculators, and temperature sensors that directly measure the water inlet and outlet temperatures. These systems use water flow rate and direct water temperature measurements to derive a measurement of the thermal energy output. However, these systems are expensive, inaccurate, difficult to install and maintain. For example, direct measurement of flow rate requires a mechanical flow meter which has to be installed in line with existing plumbing which is often difficult to install and is subject to failure and requires maintenance.

Therefore, there remains a need for providing cost-effective, accurate, and easy-to-install thermal energy output metering for reducing energy consumption in water heating systems.

BRIEF SUMMARY OF THE INVENTION

Embodiments of the present invention relate to a controller system and methods for use in water heating systems that offers significant opportunities for energy saving as well as application in a variety of utility grid integration use cases. The controller system and methods allow control of the water heating system to provide more effective optimization of utility grid integration applications. The controller system can adjust the water heating system in response to energy demand patterns of user fixtures and reduce standby losses at least by minimizing the time when the heated water is maintained at an elevated temperature. The controller system can detect heated water usage pattern and produce a heated water usage profile. The heated water usage profile includes energy content information related to when heated water is typically used and also the quantity used. For example, the controller system can monitor differences of heated water usage between weekdays and weekends, different times of a day, and/or different seasons. The controller system controls water heating systems to operate based on the energy demand curve and adjust the thermal energy output as demand shifts to reduce standby loss. This allows users to monitor their energy demand curve and reduce energy consumption of water heating systems.

In some embodiments, the controller system can measure thermal energy output after productive use of heated water by subtracting standby loss from the total energy consumed by the water heating system. The controller system can indirectly measure the standby loss using the electrical energy consumption when no heated water is removed from the water heating system. For gas water heaters, the thermal energy consumed and standby loss can be determined using methods described in the present disclosure. For example, water heater controller can use real-time monitoring of hot and cold water temperature sensors and the gas water heater's energy consumption rating and energy efficiency to determine thermal energy consumed and standby loss.

In some embodiments, the controller system can determine the quantity or volume of the used heated water without a mechanical flow meter. Using the thermal energy output of the water heating system, the controller system can detect the timing of each heated water drawing event and measure volume of water used by using information such as temperature differential between heated and cold water. Effectively, this derived metering method allows detailed insights of the system status and the usage at any given time without relying on plumbed-in sensor technology.

In some embodiments, the controller system can derive temperature differentials between cold and heated water of the water heating system by measuring exterior temperatures of cold water inlet pipes and heated water outlet pipes. The controller system can include cost-effective, accurate, and easy-to-install temperature sensors and provide temperature differentials between the cold and heated water without direct contact with the water body. For example, an attachable sensor such as an attachable cold temperature sensor can be attached to the exterior of the cold water inlet pipe at a location proximate to the reservoir. In some embodiments, an attachable sensor such as a negative-temperature-coefficient (NTC) temperature sensor can be attached to the heated exterior of a water tank, for example, a temperature and pressure (T&P) port/valve of the water heating system. The water pipe temperature sensors can be cost-effective and easy-to-install sensors that are attached to the water pipes through a strap or other attachment methods. In addition, temperature compensation processes can be applied to obtain accurate and real-time measuring of the water temperatures within the heated and cold water pipes. Temperature compensation process can include temperature compensation algorithms that adjust the obtained data from temperature sensors based on various factors such as, for example, locations of the temperature sensors, sensor surface exposure to ambient environment, and any other suitable factors. The temperature compensation process also allows minimum or no thermal insulation to further reduce cost and ease of retrofitting into existing water heaters. Therefore, the temperature compensation process allows for simple and low cost temperature measuring in electric or gas water heaters.

Directly measuring thermal energy output typically requires a flow meter, plumbed-in temperature sensor, and calibrated calculator. An accurate metering method using a line-averaging and in-tank sensor can meter energy input, output, and loss in a storage-style water heater. An example of a simpler, line-averaging, in-tank sensor is described in U.S. Patent Application No. US 2015/0285690A1, titled "Thermal Energy Metering Using an Enthalpy Sensor" and filed on Apr. 8, 2014 and is incorporated herein by reference in its entirety.

However, the in-tank sensor method can require retrofitting the sensor into an existing tank such that the sensor is physically in the heated water being measured. The apparatus and methods described in this application are not only compatible with the accurate metering method, but also provide the benefit of circumventing the need for an in-tank sensor. Only externally attached temperature sensors and electrical power metering are needed to provide usage profile and energy content information for storage-style water heating systems. Such apparatus and methods can be embodied in a retrofit context or as components within a new water heating system.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIGS. 3A and 3B are schematic representations of portions of water heating systems, in accordance with some embodiments.

DETAILED DESCRIPTION

While the present disclosure is made with reference to illustrative embodiments for particular applications, it should be understood that the disclosure is not limited thereto. Those skilled in the art with access to the teachings herein will recognize additional modifications, applications, and embodiments within the scope thereof and additional fields to which the disclosure would apply.

Figure 1:
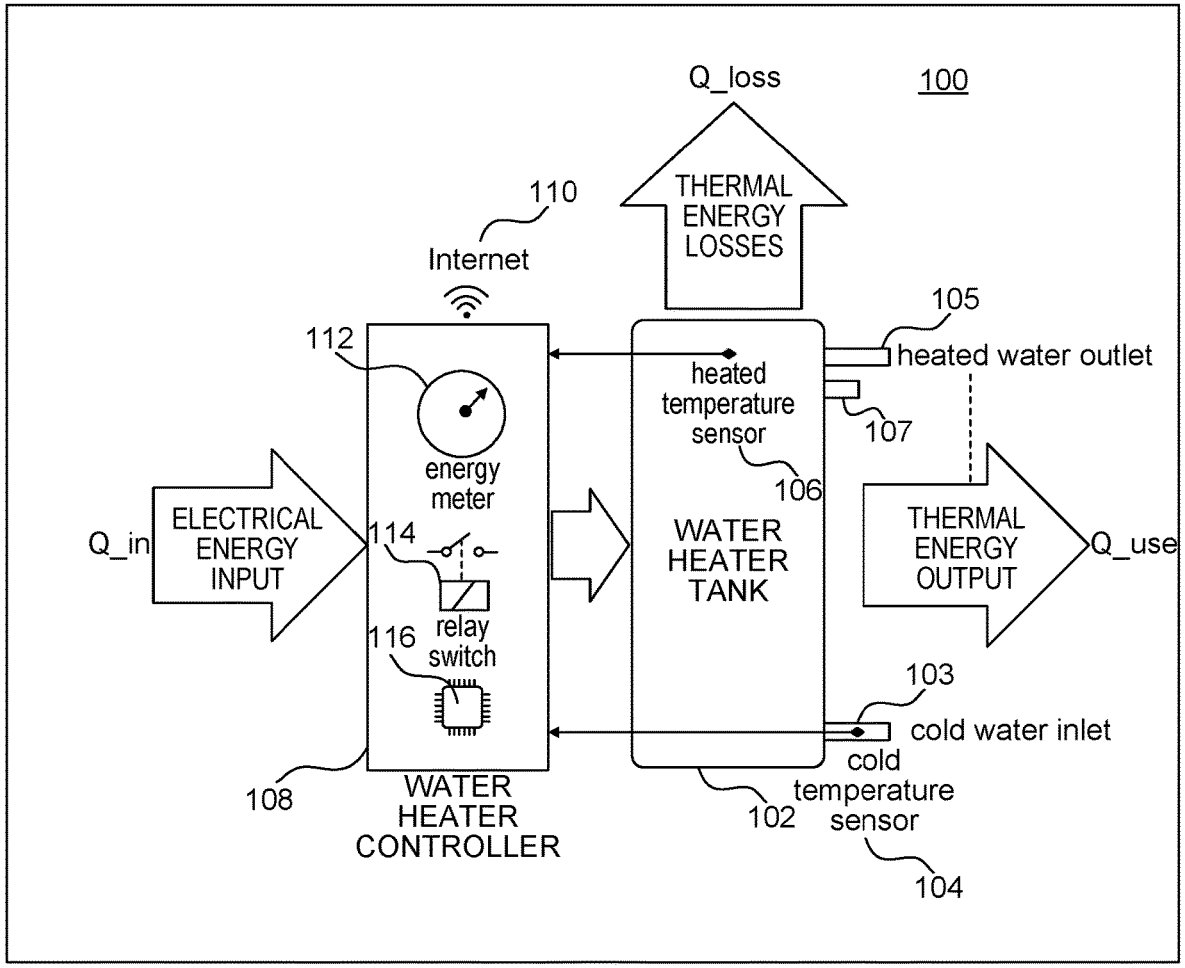
FIG. 1 is a schematic representation of a water heating system having a controller system, in accordance with some embodiments.

FIG. 1 is a schematic representation of a water heating system 100. Water heating system 100 can include water heater tank 102, cold water inlet 103, cold temperature sensor 104, heated water outlet 105, heated temperature sensor 106, T&P valve 107, and water heater controller 108. Heating elements utilizing electricity, gas, oil, or other energy sources can be immersed in water heating system 100 and are not illustrated in FIG. 1 for simplicity. Water heater controller 108 can include internet 110, energy meter 112, relay switch 114, and microcontroller 116. In some embodiments, respective cold and heater temperature sensors 104 and 106 are integrated parts of water heater controller 108.

Water heating system 100 utilizes external energy sources to elevate the temperature of water stored in its water heater tank 102. When energy input $Q_{in}$ is transferred to the water in water heater tank 102, the average temperature of the water in the tank will rise. For example, energy input $Q_{in}$ can be electrical energy supplied to water heating system 100, and electrical energy can be converted into thermal energy of the water with a near 100% efficiency via immersed heating elements. $Q_{in}$ can be determined using supply voltage and current of the electrical power source, as well as the time period of the power supplied. For gas water heaters, $Q_{in}$ can be determined using the BTU rating and water heater efficiency of the specific water heater, as well as the time period of when the gas burner was activated.

Energy meter 112 can provide accurate measurements of the supply voltage and current of the external power source using low cost electronics and software adjusted calibrations. External power source provides voltage and current to the immersed heating elements, and electrical energy can be converted to thermal energy that is used to elevate the temperature of water in water heater tank 102.

Gas water heaters use a gas meter to gauge the amount of gas consumed for heating the stored water. However, directly obtaining usage information from the gas meter can be challenging compared to obtaining information from an electrical energy meter. The present disclosure presents alternatives for determining the thermal energy consumed and standby loss of a gas water heater by using the heated and cold temperature sensors as well as readily available information for the gas water heater. For example, the water heater make and model provides input on the "BTU rating" of the gas burners for gas heaters and also the efficiency of the specific make and/or model of the gas water heater. The BTU (British Thermal Unit) rating is a representation of the heating capability of the water heating system. If the make and/or model information of the gas water heater is not readily available, the tank volume information can be used as an alternative since the tank volume and BTU rating of gas water heaters are strongly correlated. For example, a common household 40-gallon gas water heater has a BTU rating of around 35,000, while a 75-gallon gas water heater can have a BTU rating of around 75,000. As described in further detail below, real-time monitoring of heated and cold temperature sensor data allows the determination of the starts and stops of the gas heating events as well as their duration.

FIG. 1 also illustrates the energy flow of water heating system 100, beginning with energy input $Q_{in}$. A thermal energy balance is applicable to water heating system 100 which indicates that $Q_{in}=Q_{use}+Q_{loss}$, where $Q_{use}$ is the thermal energy output and $Q_{loss}$ is the standby energy loss.

The increase in the average temperature of the water is directly proportional to the amount of energy input $Q_{in}$ transferred to water heater tank 102. Energy input $Q_{in}$ can increase the water temperature in water heater tank 102 by a temperature difference $\Delta T$ according to the following equation: $Q_{in}=m*C_p*\Delta T$. $Q_{in}$ is the amount of input energy measured in, e.g., Joules; m is the mass of the water in the water heater tank 102; Cp is the heat capacity of the water (e.g., approximately 4.183 J/g.K for liquid water at typical operating temperatures and pressure, and varies depending on the change in temperature of the system); and $\Delta T$ is the change in temperature (e.g., average tank temperature) over the measurement period measured in, e.g., degrees Kelvin.

As described above, heated water stored in the reservoir loses heat at an energy loss rate which is dependent upon the ambient and water temperature, as well as the insulating material's resistance to conductive heat flow. This standby loss occurs even without productive use of energy and requires reheat cycles of water heating system 100 in order to maintain a desired water temperature in water heater tank 102. Generally, the energy loss rate R is relatively constant for a given water heating system, and water stored in water heater tank 102 is reheated to the same temperature level. In addition, an electronic thermostat control system using water heater controller 108 can provide accurate reheating of water to the original temperature level. During reheat events where there is no productive use of energy, $Q_{use}=0$ thus $Q_{in}=Q_{loss}$. Therefore, the energy loss rate R can be calculated using input energy $Q_{in}$ consumed in each reheat cycle and the time elapsed between each reheat cycle. In some embodiments, the energy loss rate R can be continually adjusted over time to ensure maximum accuracy. With a determined energy loss rate R, the standby energy loss $Q_{loss}$ for any certain period of time can be derived by multiplying that period of time by energy loss rate R.

Thermal energy output $Q_{use}$ is the productively used energy of water heating system 100 and is crucial information as it indicates the volume of heated water actually used by the user. Thermal energy output $Q_{use}$ can be derived using energy input $Q_{in}$ subtracted by standby energy loss $Q_{loss}$, as indicated in the following equation: $Q_{use}=Q_{in}-Q_{loss}$. For a given time t', the thermal energy output $Q_{use}$ can be derived as $Q_{use}=Q_{in}-R*t'$.

Once a certain energy output $Q_{use}$ is determined, the volume of used heated water V can be derived using $V=Q_{use}/(\rho*C_p*\Delta T)$, where p is the density of liquid water (e.g., approximately 1 g/cm³ at typical operating temperatures and pressure, and varies depending on the change in temperature of the system), and $\Delta T$ is the temperature differential between the cold inlet water and the heated water. As indicated by the above equation, temperature differential $\Delta T$ is needed in order to derive the volume of used heated water V. In addition, it is also required to know if productive use of heated water occurred prior to the reheat cycle. However, traditional systems and methods that use flow rate meters and plumbed-in sensors to derive the volume of used heated water can be expensive, unreliable, and difficult to maintain.

Various embodiments of this disclosure provides an easy-to-install, low cost, and reliable apparatus of detecting heated water usage and deriving the volume of used heated water. Attachable temperature sensors can be used to measure exterior temperature of cold and heated water pipes, and the water heating system can use the measured temperatures to derive temperature differentials between the cold and heated water. Algorithmic analysis of time-series data obtained from the cold and heated temperature sensors offers a feasible and reliable method for monitoring if and when heated water usage took place. In addition, the algorithmic analysis of cold and heated temperature sensors can derive the duration of each individual heated water usage event, which in turn can be used to determine the volume of used heated water by using the derived temperature differentials. The heated water usage data provides valuable information for the creation of a heated-water usage profile and can improve energy efficiency and enable demand response application. Therefore, the derived metering method offers detailed insights to the energy status and usage pattern of the water heating system at any given time without the need for plumbed-in sensor technology.

The temperature differentials $\Delta T$ between the heated and cold water can be derived by using the temperature measurements of the exteriors of respective heated and cold water pipes. In some embodiments, the pipe material has a low resistance to conductive heat flow and the temperature of the exterior of the pipe can be equal to the water temperature within the pipe after achieving thermal equilibrium. In some embodiments, even if the temperature of the exterior of the pipe is different from the water temperature within the pipe, the temperature differential between the measured exterior temperatures of the cold and heated water pipes is still an accurate indication of the temperature differentials of the cold and heated water flowing within the respective pipes.

The attachable temperature sensors can be mounted on the cold water pipe to measure a cold temperature, and mounted on the heated water pipe to measure a heated temperature. The attachable temperature sensor can be, for example, a strap-on sensor that can be easily attached and removed from a water pipe.

In some embodiments, cold temperature sensor 104 is mounted on the cold water pipe and proximate to the top of the water heater tank 102. In some embodiments, cold water inlet is located near the bottom of water heater tank 102, and cold temperature sensor 104 can be mounted on cold water inlet 103. During periods of time where no productive use of heated water occurred, the cold temperature sensor can warm up because heated water can extend into the cold water inlet port via thermal conduction and via thermal expansion of the heated water. The cold temperature sensor can be strapped on any cold water inlet pipe proximate to the water heater tank 102, for example, on water heater tanks with cold water inlet at the top to achieve tank-reheating of the cold water temperature sensor during periods of no hot water draws. In some embodiments, cold temperature sensor 104 is positioned on cold water inlet 103 and as close as possible to water heater tank 102. The absolute temperature readings is not necessary for accurately detecting the start and duration of heated water draw events, but can be useful to detect and determine temperature changes and/or fluctuations.

In some embodiments, heated temperature sensor 106 can be mounted on a heated water pipe such as, for example, strapped onto the T&P valve 107 of water heating system 100. This configuration can allow a stable top tank temperature reading, which can be used for thermostatic temperature control of the water heater tank 102. T&P valves are usually located at or near the top of heater tank 102 and its exterior temperature usually fluctuates less compared to heated water outlet 105, especially during draws of heated water. Therefore, heated temperature sensor 106 attached to T&P valve 107 can produce more accurate and stable temperature readings, in accordance with some embodiments. Although temperature sensors attached to T&P valve 107 may provide a more stable and/or reliable temperature measurement, due to water heater configuration or space limitation, heated temperature sensor 106 can also be attached to heated water outlet 105, in accordance with some embodiments. The attachable temperature sensors are configured to measure the temperature of a pipe exterior and capable of transmitting the temperature measurements to water heater controller 108 using any suitable devices or connections such as, for example, cable, wireless transmission, other suitable connections, and/or combinations thereof.

A T&P valve can be made from brass material and is typically placed in an ambient temperature environment. For example, T&P valve 107 can be placed outside of water heater tank 102 and includes a neck that extends through a layer of thermal insulating material and threads into a port in the steel tank wall of water heater tank 102. A copper pipe is typically attached to T&P valve 107, draining a significant amount of heat from the T&P valve. Therefore, a significant temperature gradient is formed by this construction, resulting in a lower temperature at the exterior surface of T&P valve 107 compared to the water temperature of heated water stored in the upper portion of water heater tank 102. Similarly, temperature gradient also exists in cold water inlet 103 and heated water outlet 105 since both pipes extend out from water heater tank 102 through the layer of thermal insulating material. Since the attachable temperature sensors are attached (e.g., strapped on) to T&P valve, heated or cold water pipes, they are in fact directly measuring the temperature of the exterior surface of the valve or water pipes rather than the temperature of water flowing therein. However, accurate measurement of heated water or cold water through metering on the exterior of the valve or water pipes can be obtained by applying temperature compensation processes, Water heater controller 108 or other suitable processors can receive the temperature measurement from cold temperature sensor 104 and heated temperature sensor 106 and determine the actual water temperature. For example, a temperature of heated water at the upper portion of water heater tank 102 can be derived from measurement obtained by heated temperature sensor 106 attached on T&P valve 107 and in close proximity to water heater tank 102. The temperature of heated water can be derived using the following equation: $T_{top\_actual} = T_{top\_measured}(T_{top\_measured} - T\_ambient)/k$, where $T_{top\_actual}$ refers to the derived water temperature at the upper portion of water heater tank 102, $T_{top\_measured}$ refers to the temperature measurement obtained from heated temperature sensor 106, T_ambient refers to the ambient temperature (e.g., 20° C.), and k refers a compensation factor empirically established for a specific water heater tank configuration. Compensation factor k can be determined by various factors such as, for example, pipe material, the configuration of T&P valve, the water heater tank's make and model, thermal insulation, the amount of temperature sensor surface that is exposed to ambient temperature, other suitable factors, and/or combinations thereof. For example, different compensation factors can be provided for T&P valves with different lengths. In some embodiments, compensation factors can be different based on if a drain pipe is attached and/or drain pipe material (e.g., copper, PVC, CPVC, or any suitable pipe material). In addition, an ambient temperature sensor can be placed in the ambient environment to accurately measure the ambient temperature. Directly measuring ambient temperature can allow temperature compensation where the water heater tanks are not in a conditioned environment. For example, water heater tanks can be located in a utility room where the ambient temperature is different from regular residential room temperature. In some embodiments, the temperature measurements are obtained and delivered to a server through telecommunication channels or internet connections. The server can automatically determine if the temperature measurement is abnormal (e.g., higher or lower than a pre-set temperature threshold) and if so apply a customized compensation factor to obtain the actual water temperature. In some embodiments, water heater controller 108 can apply the customized compensation and/or notify the user of the abnormal temperature measurement. Therefore, the temperature compensation process allows accurate top tank temperature readings while using a strap-on temperature sensor and in turn reduces or eliminates the need for thermal insulation for the sensors.

Figure 2:
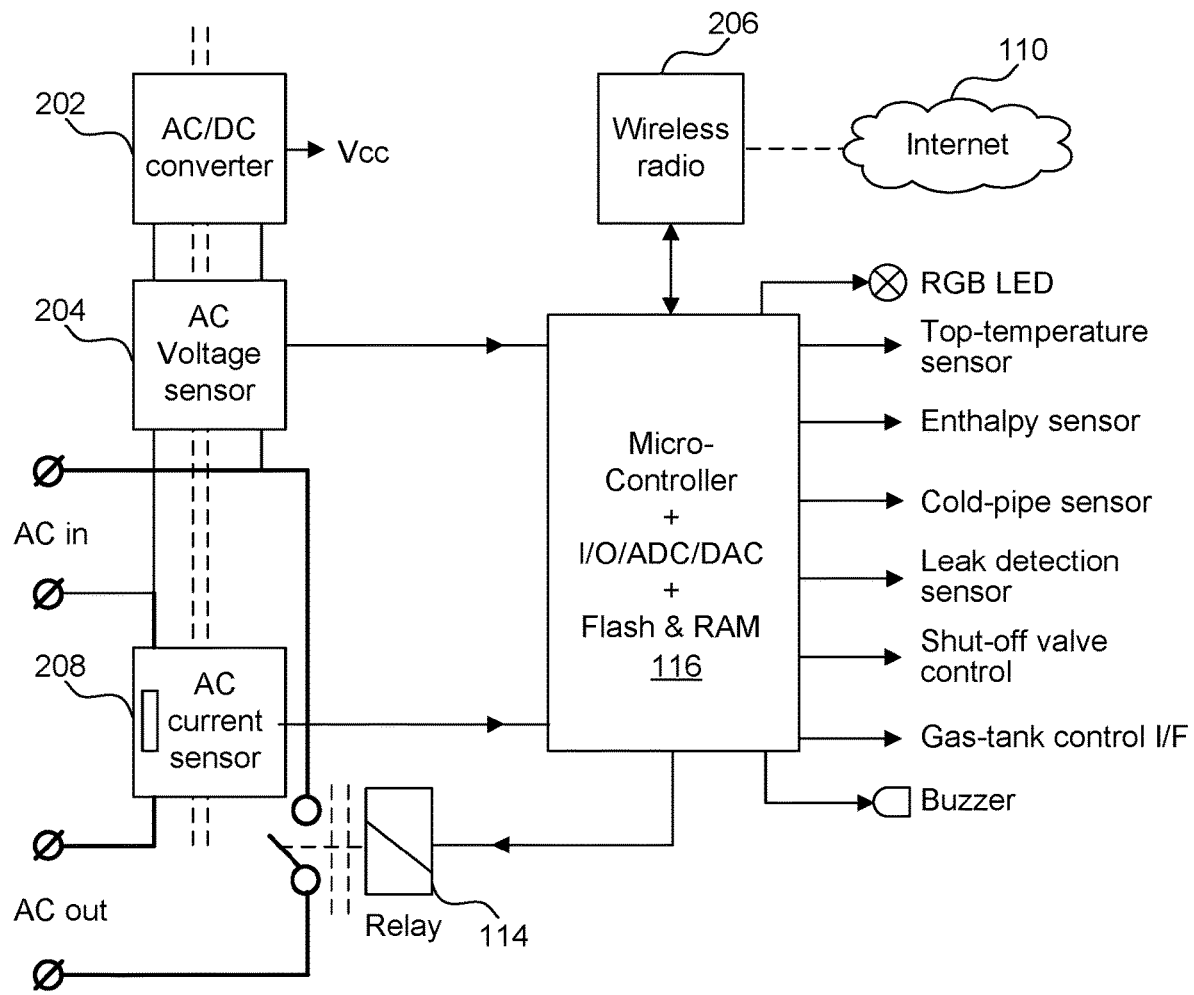
FIG. 2 is a schematic representation of a controller system, in accordance with some embodiments.

FIG. 2 is a schematic representation of a water heater controller 108. Water heater controller 108 can include internet 110, relay 114, microcontroller 116, AC/DC converter 202, AC voltage sensor 204, wireless radio 206, and AC current sensor 208. Water heater controller 108 can further include analog-to-digital converters (ADC). In some embodiments, a high-resolution (e.g., 24-bit) ADC can be used. In some embodiments, a lower-resolution (e.g., 10-bit or 12-bit) ADC can be used. ADC converts analog signals received from temperature sensors to digital signals for further digital signal processing. The signals can be used to determine the temperature differentials and/or the start and end time of productive heated water usage. In some embodiments, water heater controller 108 can also include an oscillator or clock, such as a clock for generating a clock signal, measuring time intervals, or measuring current local time (potentially synchronized to a time server via internet). For example, water heater controller 108 can process measurements received from temperature sensors at periodic intervals. The intervals may be fixed periods, such as one measurement per second, per two seconds, per five seconds, per ten seconds, etc., as desired.

Internet 110, can be provided via any type of network connection, such as a wired connection or wireless connection. In some embodiments, internet 110 can be a local area network (LAN), private network, cellular network (e.g., 4G or LTE networks), cloud service, or any other type of network. Networked devices, such as web server, personal computer, or other devices such as smartphones or tablets, may access information from sensor controller via the network, such as internet 110. In some embodiments, a device, such as personal computer, may be connected (via wired or wireless connection) directly to an interface of the water heater controller or to an interface of the router.

Water heater controller 108 can include one or more processors, such as microcontroller 116, which can be configured to operate according to instructions from one or more non-transitory processor readable storage media, such as a memory unit. Water heater controller 108 may be configured to receive firmware updates to firmware instructions stored in a memory unit. Water heater controller 108 can receive firmware updates in any of a variety of techniques. For example, firmware updates may be applied manually using a tangible medium over a wired interface, or over-the-air firmware updates may be received automatically over a network via the router. In some embodiments, the memory unit can be configured for storing measurements or calculations. In some embodiments, a different memory unit may be provided for storing measurements or calculations. Microcontroller 108 can further include any suitable connection ports providing connections to other components of water heating system 100 such as, for example, RGB LED, top-temperature sensor, optional enthalpy sensor, cold-pipe sensor, leak detection sensor, shut-off valve control, gas-tank control interface, buzzer, and/or other suitable components. While the term "microcontroller" is used here, the processing unit for the sensor controller could include any form of general purpose or specific purpose processing circuitry, including application-specific integrated circuits, that can carry out the types of functions identified.

FIGS. 3A and 3B are schematic representations of portions of water heating systems 300A and 300B, respectively, according to some embodiments. FIGS. 3A and 3B include water heater tank 302, cold water inlet 303, cold temperature sensor 304, heated water outlet 305, and heated temperature sensor 306. Other structures can be included and are omitted for simplicity. In both water heating systems 300A and 300B, cold water inlet 303 is connected to water heater tank 102 at the tank's top surface. In some embodiments, cold water inlet 303 can be attached to the lower portion of water heater tank 102. As shown in both FIGS. 3A and 3B, cold temperature sensor 304 is mounted on cold water inlet 303, and in close proximity to water heater tank 302 such that after a hot water drawing event, cold temperature sensor 304 can detect and measure the rise in sensing temperature due to heat conducted from the heated water stored in water heater tank 302 to cold water inlet 303. If cold temperature sensor 304 is mounted further away from water heater tank 302, the temperature gradient may cause a temperature rise too small for cold temperature sensor 304 to detect, or the signal-to-noise ratio falls below a sensitivity threshold for cold temperature sensor 304 and is thus undetectable. The nominal position of cold temperature sensor 304 can depend on various factors such as, for example, cold water inlet piping configuration, piping material, ambient temperature, any other suitable factors, and/or combinations thereof. Water heating system 300A also includes a T&P valve 307A mounted on the sidewall of the upper portion of water heater tank 302, while water heating system 300B includes a T&P valve 307B mounted on the top surface of water heater tank 302. In both water heating systems 300A and 300B, heated temperature sensor 306 are mounted on T&P valves 307A and 307B, in accordance to some embodiments. In some embodiments, heated temperature sensor 306 can also be mounted on heated water outlet 305. Various elements illustrated in FIGS. 3A and 3B can be similar to their respective counterparts described in FIG. 1, and are not described here in detail for simplicity.

Vital information obtained through accurate measurement of cold water temperature at the cold water inlet pipe can be used for dynamic analysis of the temperature changes. For example, cold water temperature measurements can be used to accurately detect heated water draws and their duration, as well as water heater tank reheating processes and their duration. Cold water temperature measurement can provide further benefits compared to temperatures sensed at the heated water outlet or the T&P valve. For example, a hot water draw event will instantaneously trigger a sharp drop in the cold water temperature measurement at cold water inlet 303, providing the benefit of fast response time and real-time monitoring. Further, compared to temperature measurements obtained at heated water outlet 305 or T&P valve 307, temperature measurements obtained at cold water inlet 303 contains less signal noise and fluctuation, which in turn provides the benefit of improved reliability. In some embodiments, cold water temperature can be determined by monitoring the minimum temperature measurements obtained at cold temperature sensor 304 during long hot water draws. During long hot water draws, cold water is continuously supplied to water heater tank 302 and the temperatures of the cold water and the exterior of cold water inlet 303 are equal due to thermal equilibrium. The minimum cold temperature can change throughout the year and can vary significantly for various geographic locations. The cold water inlet temperature is vital for correctly determining energy gains and losses in the water heater tank, as this drives the temperature difference component in the formula that determines the energy input $Q_{in}$. The detection of hot water draws and their duration is based on real-time analysis of the cold water temperature sensor data and primarily triggered by sharp drops in temperature measurements which can indicate the start of hot water draw events. Cold water temperature sensor data can also be used to determine the start of a reheating process which can indicate the end of a hot water draw event. Detecting the start and duration of water heater reheating performed by monitoring and analyzing measurements of cold temperature sensor 103 can provide the benefit of fast response speed and high reliability.

Figure 4:
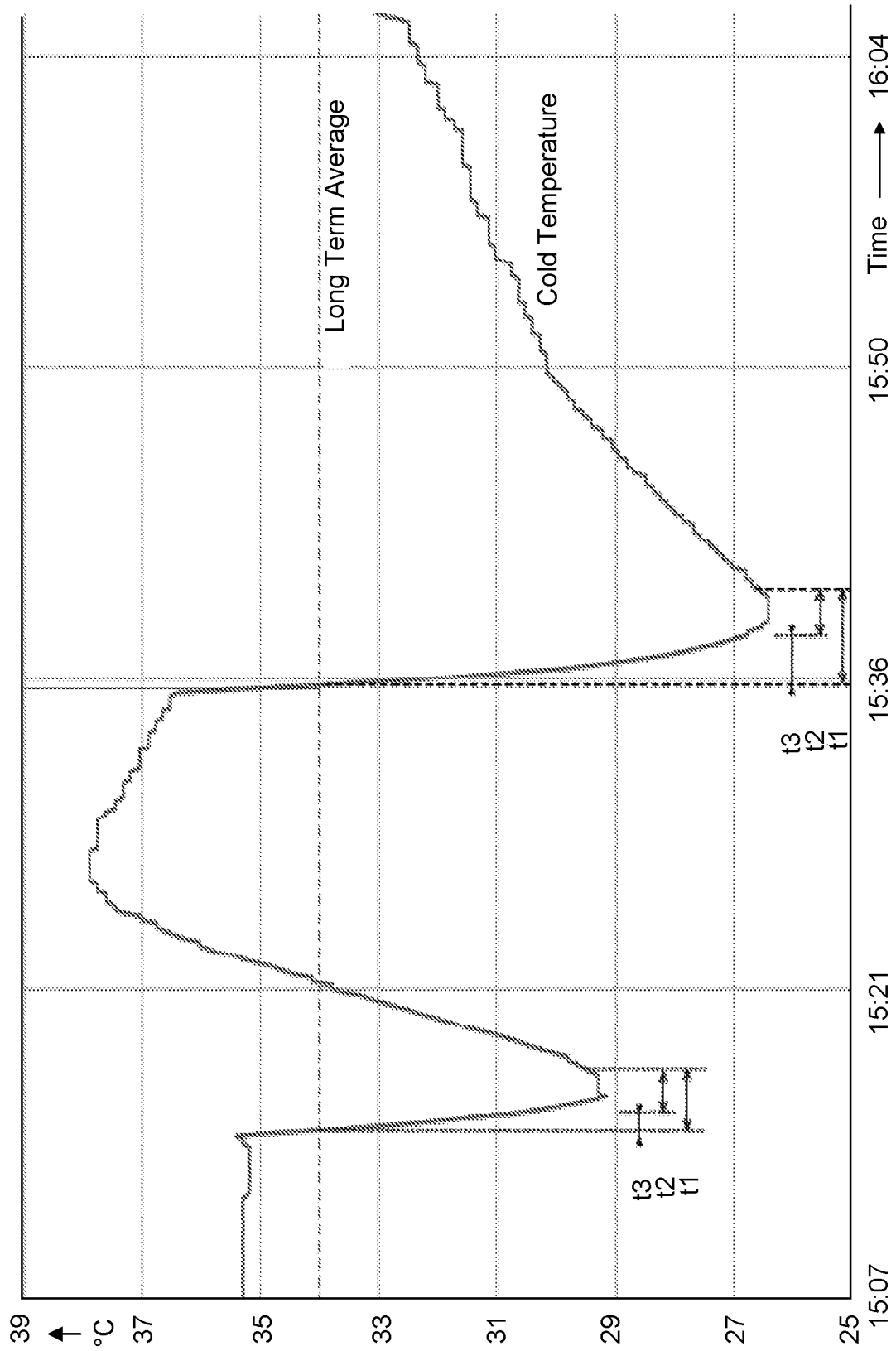
FIG. 4 is a diagram of time versus cold water temperature at a cold water inlet, in accordance with some embodiments.

FIG. 4 is a schematic representation of a temperature measurement of the exterior of a cold water inlet pipe during reheat cycles of water heating system 100. During periods of time where no heated water is productively used, the temperature of the exterior of the cold water inlet pipe increases because heated water can extend into the cold water inlet port due to thermal conduction and thermal expansion of water being heated up. At least for this reason, it is preferred that cold temperature sensor 104 is located in close proximity to water heater tank 102. Once heated water is productively used, for example, when a heated water draw event starts, cold water continuously feeds through the cold water inlet pipe into water heater tank 102 and causing the cold sensor temperature reading to drop instantly and rapidly. Water heater controller can use the algorithm to keep track of a slowly adapting long term average temperature of this sensor, and as soon as the temperature reading drops steeply and is below the long term average of the cold temperature sensor measurements, it is interpreted as the start of a heated water draw event. The water controller can accurately detect the start and duration of heated water draw events. For example, the water controller can monitor the slope of temperature over time and detect heater water draw if the slope is sufficiently steep (e.g., greater than a threshold value). Once the heated water draw ends, the exterior of the cold water inlet pipe will start to reheat after a period of thermal inertia due to the thermal mass of the system. The total duration for this event is shown as $t_1$ in FIG. 3. It is noted that the schematic representation in FIG. 3 is provided as an example and should not be limiting. The water heater controller follows the algorithm and monitors the shortest possible draw time $t_1$ over time, which results in deriving the shortest thermal response time of the system shown as $t_2$. This allows to derive the actual duration of the heated water use event $t_3$ which is $t_3=t_1-t_2$. The actual duration of the heated water use can be accurately measured and the duration can be any suitable amount of time. For example, $t_1$, $t_2$, and $t_3$ can be about 250 s, 240 s, and 10 s, respectively. In another example, $t_1$, $t_2$, and $t_3$ can be about 270 s, 240 s, and 30 s, respectively.

Figure 5:
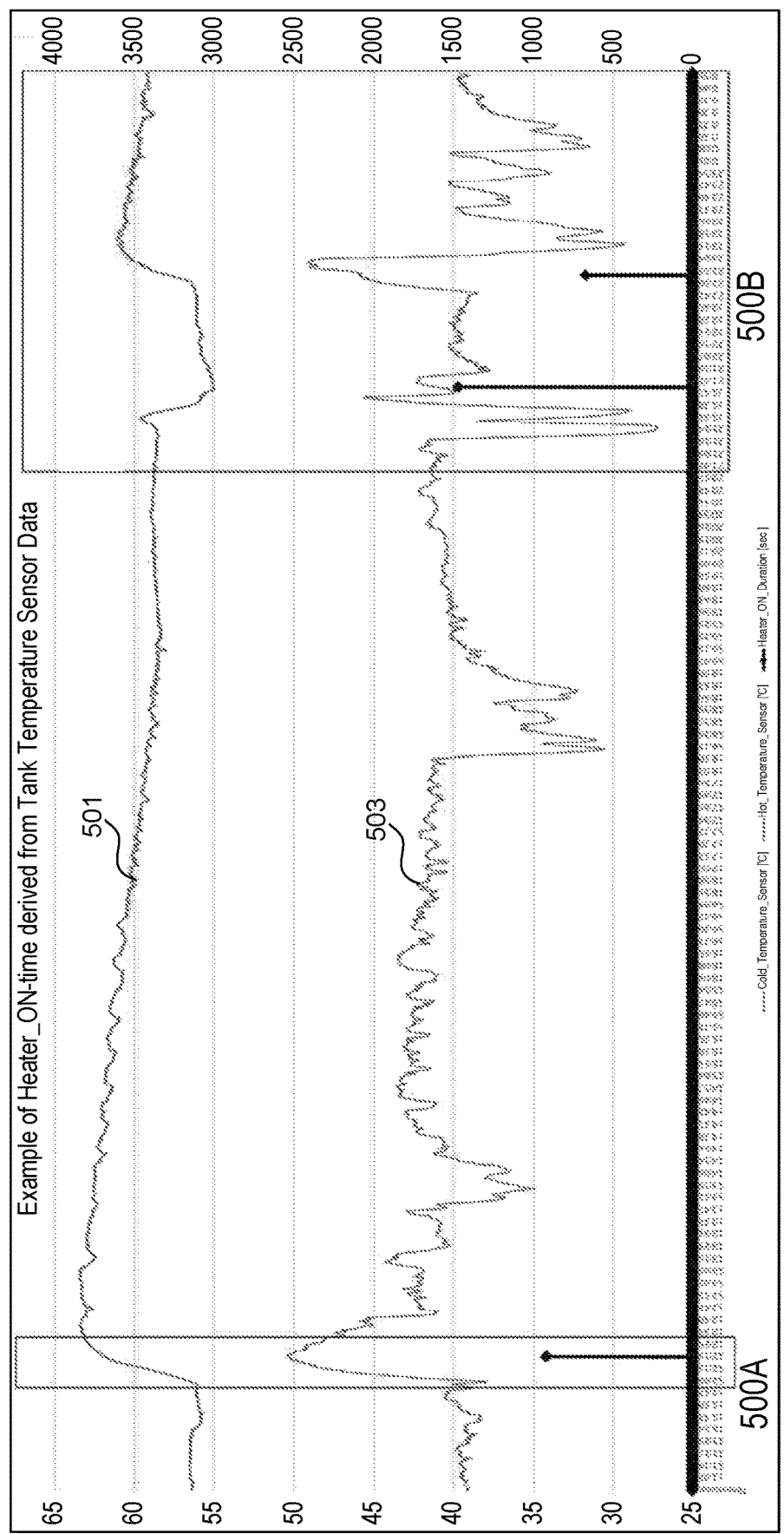
FIG. 5 is a schematic representation of temperature measurements of obtained by a heated water outlet sensor and a cold water inlet pipe sensor, in accordance with some embodiments.

FIG. 5 is a schematic representation of a temperature measurement of the exterior of a cold water inlet pipe during reheat cycles of water heating system 100. Vital information obtained through accurate measurement of cold water temperature at the cold water inlet pipe can be used for dynamic analysis of the temperature changes. FIG. 5 illustrates heated water temperature measurement data 501 and cold water temperature measurement data 503, respectively obtained from heated and cold temperature sensors. Examples of heated and cold temperature sensors can respectively be heated and cold temperature sensors 306 and 304 described above in FIGS. 3A and 3B. FIG. 5 also illustrates first and second water heater events 500A and 500B, respectively. As shown in FIG. 5, during both first and second events 500A and 500B, responses of cold temperature sensor to the heated water drawing event and heating activity are more sensitive and faster than the corresponding response of heated temperature sensor to the same events. In addition, the cold water temperature measurement can be constantly changing, often due to ambient temperature fluctuations such as, for example, temperature changes caused by a forced air home heating system. This can be considered noise and the water heater controller can detect and eliminate this noisy temperature data during the temperature compensation process, as further explained with reference to FIG. 6 below.

Figure 6:
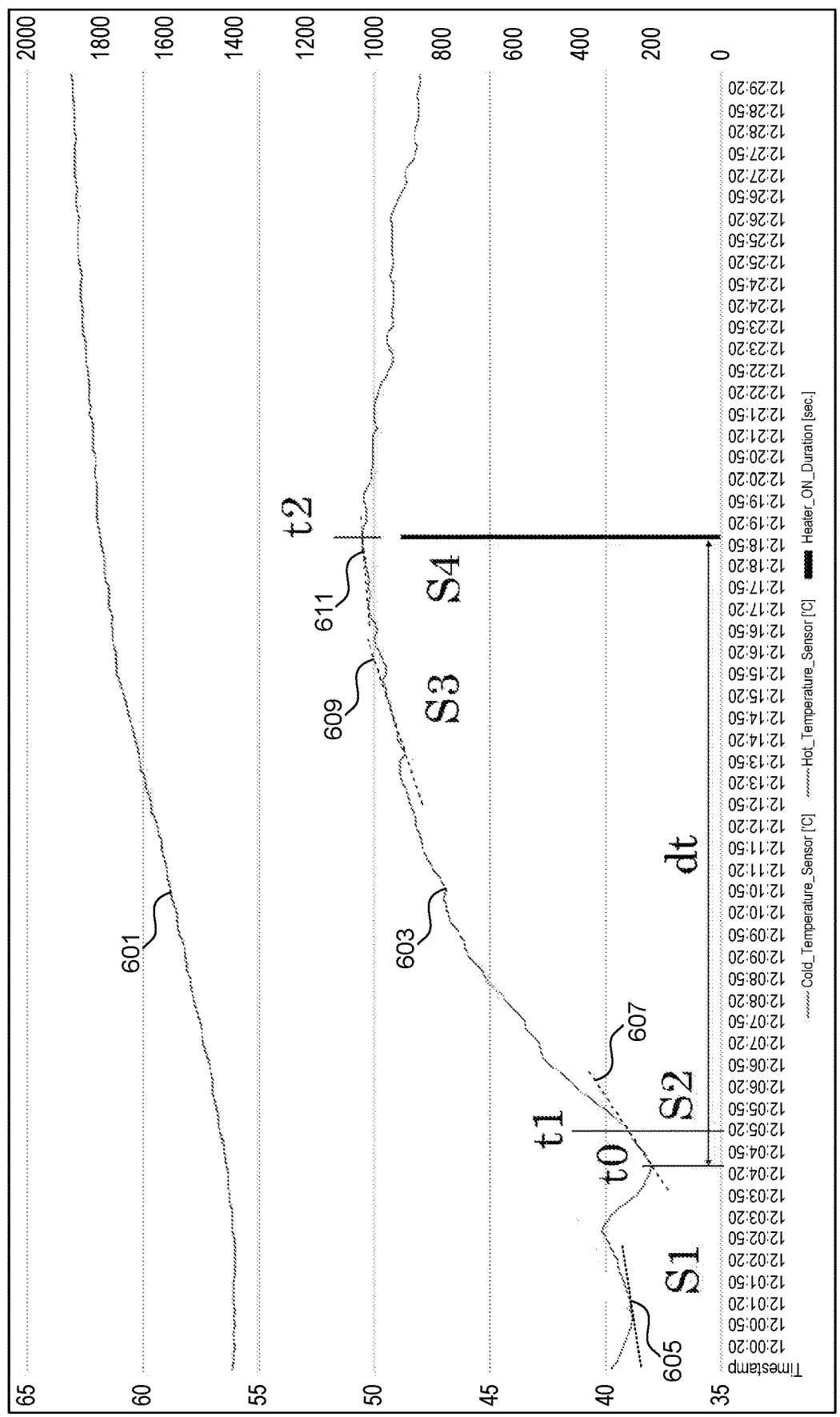
FIG. 6 is a schematic representation of hot water sensor measurement and cold water inlet pipe temperature measurements during heating and reheating cycles of water heating system, in accordance with some embodiments.

FIG. 6 is a schematic representation of temperature measurements and noise filtering during heating and reheating cycles of water heating system 100, according to some embodiments. FIG. 6 illustrates heated water temperature measurement data 601 and cold water temperature measurement data 603, respectively obtained from heated and cold temperature sensors. Examples of heated and cold temperature sensors can respectively be heated and cold temperature sensors 306 and 304 described above in FIGS. 3A and 3B. In some embodiments, the heating and reheating cycles described in FIG. 6 can be a zoomed-in view of first event 500A described above in FIG. 5. In some embodiments, FIG. 6 can be describing a heating and reheating cycles different from first event 500A. As shown in FIG. 6, the temperature measurement data obtained from heated and cold temperature sensors can vary during the same time frame with data obtained from cold temperature sensor providing additional information. As evidenced by the differences in the measurement data obtained from the heated and cold temperature sensors, the heated temperature sensor data illustrates that it may not include details as sophisticated as data obtained at the cold temperature sensor. Rather, temperature data obtained by the cold temperature sensor includes sufficient level of detail and indicators of water heater activities such that the water heater controller can detect activities such as, for example, heating, reheating, hot water draw, and cold water supply using data obtained from the cold temperature sensor. FIG. 6 illustrates that a water heater controller can detect the difference between noise and actual start of tank reheating by determining if the slope of the reheating stays below or exceeds a pre-set threshold slope value. For example, slope 605 in section S1 can be below the threshold slope value while slope 607 in section S2 can exceed the threshold slope value. The water heater controller can be configured to monitor and mark each moment the slope starts rising, but only uses that time stamp as start of reheat after the slope has exceeded the minimum threshold slope value. Heat-up of the cold temperature sensor after hot water draws can result in a reheating slope that is below the threshold because no hot water is pushed into the cold water inlet pipe after hot water draws. So this offers a clear differentiation between heat-up after hot water draws and heat-up due to tank reheating—which is critical for the reheating-detection based on cold temperature sensors. The end of a reheating event in FIG. 6 can be identified by a drop of the reheat-slope (e.g., slope 611) below a threshold value at timestamp t2, while slope 609 is above the threshold value and does not qualify as the end of the reheating event. The total reheat duration (dt) will be the time between t0 and t2.

Figure 7:
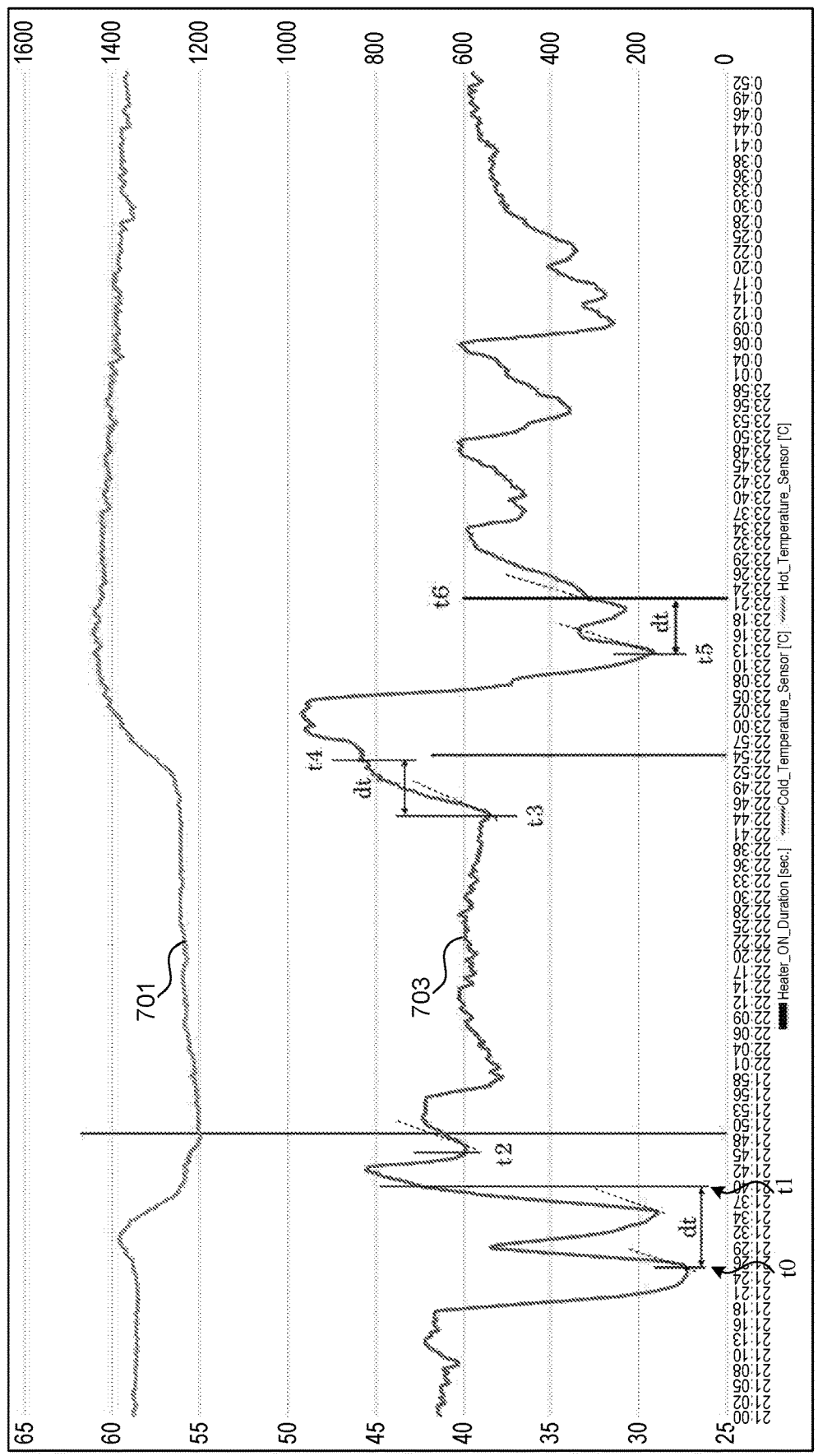
FIG. 7 is a schematic representation of detecting and measuring hot water temperature sensor and cold water pipe temperature sensor reheating events, in accordance with some embodiments.
Figure 8:
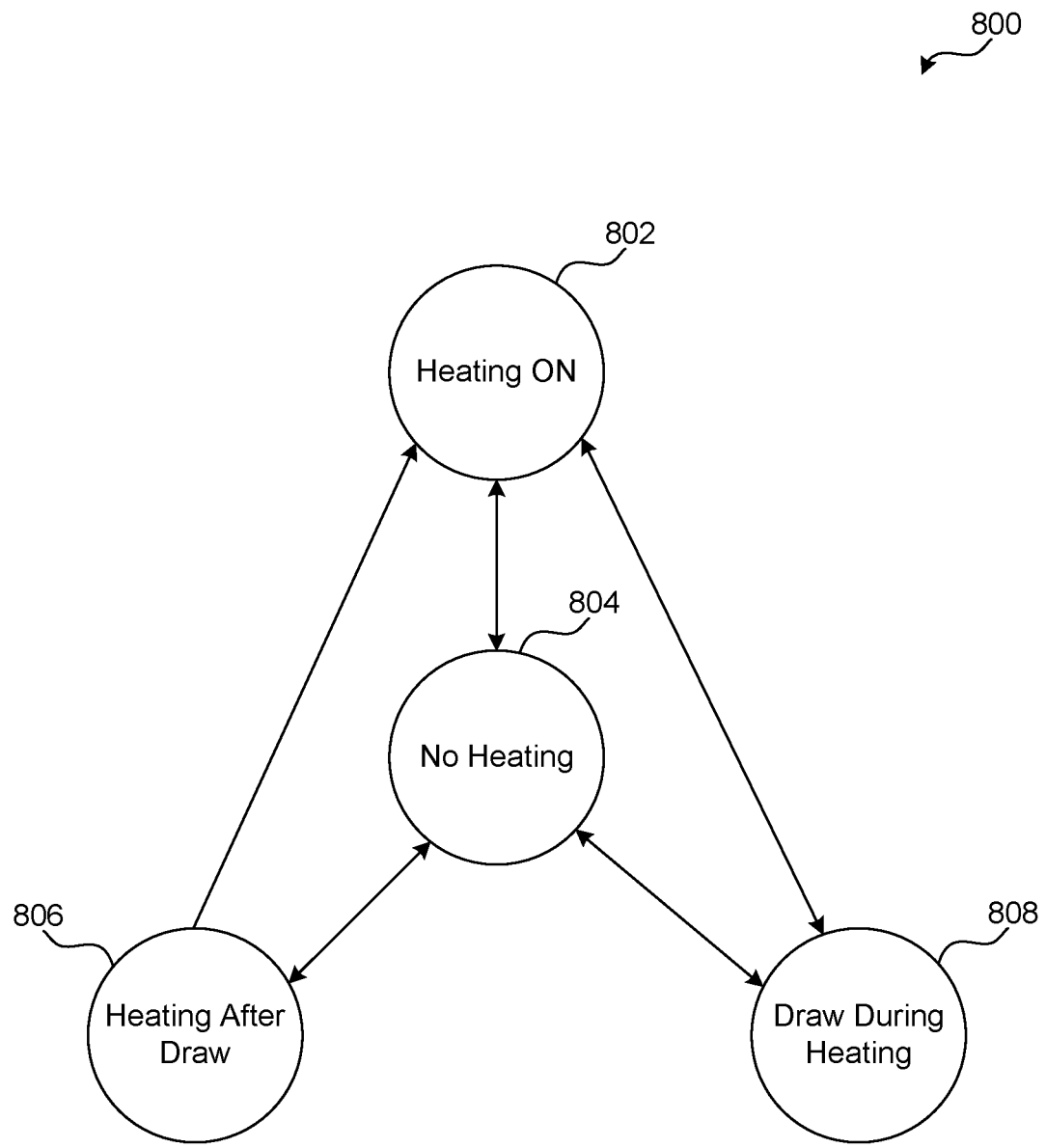
FIG. 8 is a finite-state diagram related to identification of state of tank reheating based on temperature sensor data triggering state changes, in accordance with some embodiments.

FIG. 7 is a schematic representation of detecting and measuring reheating events while heated water drawing events are occurring substantially concurrently, according to some embodiments. FIG. 7 illustrates heated water temperature measurement data 701 and cold water temperature measurement data 703, respectively obtained from heated and cold temperature sensors. Examples of heated and cold temperature sensors can respectively be heated and cold temperature sensors 306 and 304 described above in FIGS. 3A and 3B. In some embodiments, the heating and reheating cycles described in FIG. 7 can be a zoomed-in view of second event 500B described above in FIG. 5. In some embodiments, FIG. 7 can be describing a heating and reheating cycles different from second event 500B. Similar to the cold temperature sensor above, temperature data obtained by the cold temperature sensor in FIG. 7 can include sufficient level of detail and indicators of water heater activities such that the water heater controller can detect various activities using data obtained from the cold temperature sensor. FIG. 8 illustrates a finite-state diagram, which is a way to keep track of which state the water heating system is in and to which states the system can change upon a triggering event such as a detected slope change. For clarity purposes, the temperature data illustrated in FIG. 7 is explained with reference to the finite-state diagram shown in FIG. 8. It should be noted that the finite-state diagram illustrated in FIG. 8 can also be applied to other suitable scenarios during the operations of the water heater system. In addition, the finite-state diagram illustrated in FIG. 8 are merely exemplary for illustrative purposes, and additional states and transitions may be included in the diagram but are omitted here for simplicity.

First a hot water draw can result in a steep drop of the cold water temperature which often triggers the reheating process of the water heater. The reheat slope of the cold temperature sensor exceeds the minimum threshold at t0, moving the finite-state diagram to the "Heating On" state 802. During a secondary hot water drawing event, a reduced temperature is detected at the cold temperature sensor, but the water heater will move to the "Draw During Heating" state 808. After the hot water drawing event has finished, the reheating slope again exceeds the minimum threshold, confirming that the water heater tank is still heating, which is indicated by the "Heating After Draw" state 806. A third brief hot water draw takes place, but after that draw finished, the reheat slope is below the minimum threshold, indicating the reheating has finished, and the water heater will move to the "No Heating" state 804. During the reheat cycle, the water heater controller keeps track of changes in the reheat slope (shown at t1), which is then used by the water heater controller to determine the duration of the heating event (dt=t1−t0), and reported later in time (after t2) when the water heater controller can positively identify the entire sequence.

A different reheating sequence is shown between t3 and t4. The temperature sensor data shows the reheating exceeds the minimum threshold after t3, but identifies the slope drops below the threshold at t4. This was not due to a draw, as that would result in a steep drop of the cold water temperature. Due to stratification physics inside the tank (e.g., inversions), temperature increases can be observed in both temperature sensors, but these are not due to tank reheating. A third reheating event similar to the first is identified between t5 and t6. The third reheating event does not show any significant change on temperatures detected by the hot temperature sensor, but the dynamic analysis of the cold temperature sensor allows detection of this brief reheat cycle.

The above temperature measurements and heating cycles are examples to illustrate that the cold water temperature sensor information is dynamically processed and multiple water heater trigger events can cause changes between the various states in the finite-state diagram. Dynamically keeping track of intermediate events (e.g., slight changes of the cold temperature slope) in real time can be used to identify the correct moments to calculate reheat duration accurately.

Figure 9:
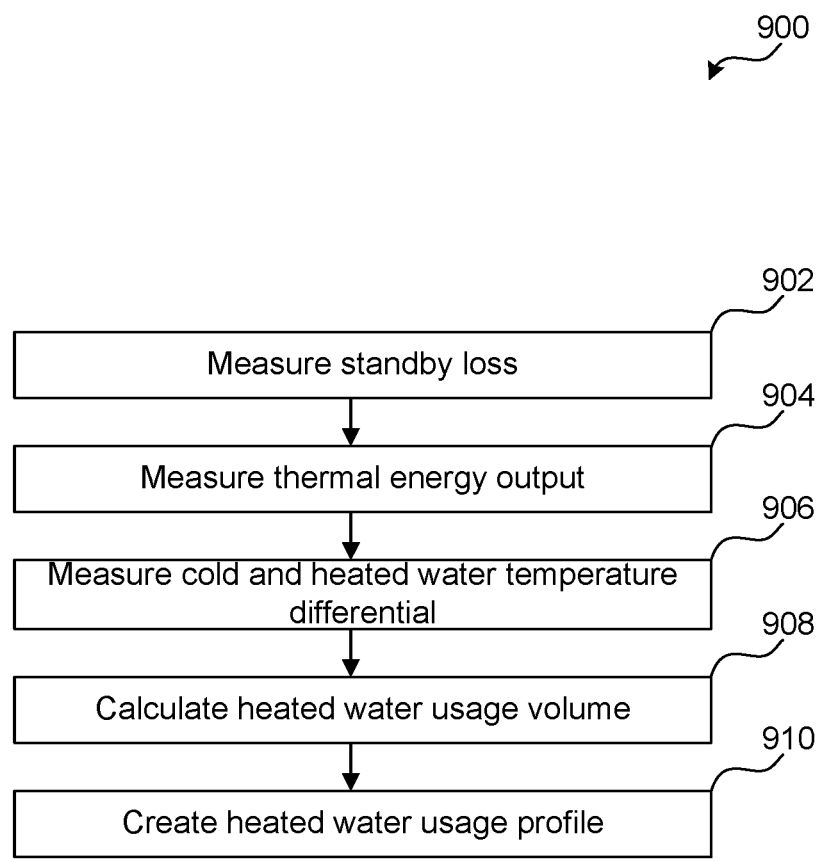
FIG. 9 is a flow chart of a method of deriving heated water usage, in accordance with some embodiments.

FIG. 9 is a flow diagram illustrating operations of an exemplary method 900 for measuring heated water usage in water heating systems and creating a heated water usage profile to provide savings in energy consumption. Other operations in method 900 can be performed and the operations can be performed in a different order and/or vary.

At operation 902, the standby energy loss rate of a water heating system can be measured, in accordance with various embodiments of the present disclosure. The standby energy loss of a water heating system occurs at a relatively constant rate, and can be affected by settings and installation configurations of the water heating system. The energy loss rate R can be derived during reheat events where there is no productive use of energy, and the input energy of the water heating system is entirely used to reheat water stored in the water heater tank to its desired temperature level. Therefore, the energy loss rate R can be calculated using input energy consumed in each reheat cycle divided by the time elapsed between each reheat cycle. In some embodiments, the energy loss rate R can be continually adjusted over time to ensure maximum accuracy. As energy loss rate R is determined, standby energy loss for any certain period of time can be derived by multiplying that period of time by the energy loss rate R.

At operation 904, thermal energy output can be measured, in accordance with various embodiments of the present disclosure. Thermal energy output is the productively used energy of water heating system 100 and is crucial information as it indicates the volume of heated water actually used by the user. As described above, thermal energy output can be derived using energy input subtracted by standby energy loss during the use of heated water. The standby energy loss during a given time t' equals to the standby energy loss rate multiplied by the time t'.

At operation 906, cold and heated water temperature differential is measured, in accordance with various embodiments of the present disclosure. The temperature differentials between the heated and cold water can be derived by using the temperature measurements of the exteriors of respective heated and cold water pipes. Attachable sensors such as attachable temperature sensors can be mounted on a cold water pipe to measure a cold temperature, and can be mounted on a heated water pipe to measure a heated temperature. The attachable temperature sensor can be, for example, a strap-on sensor that can be easily attached and removed from a water pipe. The attachable temperature sensors can be manufactured as parts of new water heating systems as well as retrofitting into existing systems. The attachable temperature sensors provides the benefits of low cost and simple installation, among other benefits.

In some embodiments, cold temperature sensors can be mounted on the cold water pipe and proximate to the top of the water heater tank. The cold temperature sensor can warm up due to heated water extending into the cold water inlet port by thermal expansion. In some embodiments, cold temperature sensors can be mounted on the cold water pipe and away from the water heater tank. The cold temperature sensor can be strapped on any suitable locations on a cold water inlet pipe. The water controller can accurately detect the start and duration of heated water draw events. For example, the water controller can monitor the slope of temperature over time and detect heater water draw if the slope is greater than a threshold value. Similarly, in some embodiments, heated temperature sensor can be mounted on a heated water pipe such as, for example, strapped onto the T&P valve of a water heating system. The heated temperature sensor can also be mounted on other suitable heated water pipes of the water heating system. Alternatively, the desired temperature can be used as the heated temperature value for the temperature differential calculation, as the water in the water heating system are reheated to the desired temperature after each reheat cycle. The attachable temperatures sensors are configured to measure the temperature of a pipe exterior and capable of transmitting the temperature measurements to the water heater controller using any suitable devices or connections.

At operation 908, heated water usage volume is measured, in accordance with various embodiments of the present disclosure. Based on a determined thermal energy output in operation 904 described above, the volume of used heated water can be derived using the density of liquid water and the temperature differential between the cold inlet water and the heated water. Temperature differential can be measured and/or derived as described above with reference to operation 904. Algorithmic analysis of time-series data obtained from the cold and heated temperature sensors offers a feasible and reliable method for monitoring if and when heated water usage took place. In addition, the algorithmic analysis of cold and heated temperature sensors can derive the duration of each individual heated water usage event. Flow rate of heated water during heated water drawing events can be calculated using the total volume of heated water used divided by the duration of the drawing event.

At operation 910, a heated water usage profile is created, in accordance with various embodiments of the present disclosure. The water heater controller system and methods described in the present disclosure can generate heated water usage profile using information obtained in operations 902-908 and offer significant opportunities for energy saving as well as a variety of utility grid integration use cases. For example, the controller system can detect heated water usage pattern based on the time and volume of heated water usage, and produce a heated water usage profile. Specifically, the heated water usage profile can include energy content information related to when heated water is typically used and also the quantity used. For example, the controller system can monitor differences of heated water usage between weekdays and weekends, different times of a day, and/or different seasons. The controller system can thus adjust the water heating system in response to energy demand patterns of user fixtures and reduce standby losses at least by minimizing the time when the heated water is maintained at an elevated temperature. For example, if the user typically uses less water during the day time, then the water heater controller system can reduce the temperature setting of the water stored in the water heater tank, thereby reducing the amount of thermal energy required to maintain it at a high temperature. On the other hand, if the user typically uses more heated water on the weekends, the water heater controller can maintain the water at a relatively higher temperature during that time frame to avoid running out of heated water. Therefore, the controller system controls water heating systems to operate based on the energy demand curve and adjust the thermal energy output as demand shifts to reduce standby loss. This allows users to monitor their energy demand curve and reduce energy consumption of water heating systems.

Various embodiments of the present disclosure provide a universal and retrofittable water heater controller with accurate energy, heated water usage, time, and duration information. The water heater controller and methods of the present disclosure allow control of the water heating system to provide more effective optimization of utility grid integration applications. In a storage-style water heater, the standby energy loss and energy loss rate can be calculated using energy input into the water heating system after uniform reheat cycle and period of no heated water usage.

The water heater controller and methods of the present disclosure can detect instances of heated water draw events based on temperature sensors attached to a cold water inlet pipe. Further, improved accuracy of hot water usage duration detection can be achieved through algorithmic analysis by including the actual derived minimum cold water temperature, the cold temperature at the start of the draw event, and the slope of temperature change during the draw event. The water heater controller and sensors are also capable of deriving cold water inlet temperature during long heated water draws using a temperature sensor attached to a cold water inlet pipe. In addition, the water heater controller and sensors can calculate the average flow rate of hot water draw events and determine the amount of heated water consumed and remaining in the water tank at any given time. The usage of cheap and easy to install strap-on temperature sensors can provide accurate power metering by low cost electronics that utilizes per unit voltage and current calibration. The heated temperature sensor can be strapped to a T&P valve. The cold temperature sensor can be located near an inlet port of the water heater tank and reheating of the cold water temperature sensor can be used to derive heated water usage information and measure the duration of each individual heated water draw in real time.

The water heater controller and methods described in the present disclosure can derive heated water usage profile such as daily and weekly (weekdays/weekends) heated water usage profile from thermal energy usage information, as well as detect time and duration of heated water usage. Valuable information such as energy input, thermal energy output, and standby energy loss can be utilized to meter and optimize water heating system efficiency. Thus, optimized demand response opportunities can be achieved while avoiding heated water outage situations for the users.

In some embodiments, a water heating system includes a reservoir and cold and heated water pipes connected to the reservoir. The water heating system further includes a cold water temperature sensor attached to the cold water pipe and located proximate to the reservoir. The cold water temperature sensor is configured to measure a cold water temperature of the cold water pipe and output a cold water temperature signal representative of the sensed cold water temperature. The water heating system also includes a heated water temperature sensor configured to measure a heated water temperature and output a heated water temperature signal representative of the sensed heated water temperature. The water heating system further includes a controller system that includes an energy meter configured to measure energy usage of the water heating system and a processor configured to receive the heated and cold water temperature signals. The processor is further configured to determine a volume of used heated water using the received heated and cold water temperature signals.

In some embodiments, a controller system for use in a storage-style water heater is presented. The controller system includes first and second sensors respectively attached to cold and heated water pipes of the storage-style water heater. The first and second sensors are configured to respectively transmit cold and heated water temperature measurements. The controller system further includes an energy meter configured to measure energy usage of the storage-style water heater and a processor configured to receive the cold and heated water temperature measurements. The processor is further configured to derive a volume of used heated water based on the cold and heated water temperature measurements.

In some embodiments, a method of determining volume of used heated water in a storage-style water heater is presented. The storage-style water heater receives cold water at a cold water inlet and outputs the used heated water through a heated water outlet. The method includes determining a thermal energy of the used heated water outputted by the storage-style water heater. The method also includes determining a temperature differential between temperatures of the cold and heated water and deriving a volume of the used heated water.

It is to be appreciated that the Detailed Description section, and not the Abstract of the Disclosure, is intended to be used to interpret the claims. The Abstract of the Disclosure section may set forth one or more but not all exemplary embodiments contemplated and thus, are not intended to be limiting to the subjoined claims.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A water heating system comprising:
a reservoir;
inlet and outlet water pipes connected to the reservoir;
an inlet water temperature sensor attached to the inlet water pipe and located proximate to the reservoir, wherein the inlet water temperature sensor is configured to measure an inlet water temperature of the inlet water pipe and output an inlet water temperature measurement representative of the inlet water temperature;
a heated water temperature sensor externally attached to a temperature and pressure (T&P) valve of the water heating system and configured to measure a heated water temperature and output a heated water temperature measurement representative of the heated water temperature; and
a controller system comprising:
an energy meter configured to measure energy usage of the water heating system; and
a processor configured to:
receive and monitor the inlet water temperature measurement and the heated water temperature measurement;
detect a real-time change in the inlet water temperature measurement;
determine a slope of the real-time change in the inlet water temperature measurement, wherein:
when the real-time change is an increase in the inlet water temperature measurement and the slope is determined to exceed a first threshold value, the processor is configured to identify a heating event and determine a duration of the heating event; and
when the real-time change is a decrease in the inlet water temperature measurement and the slope is determined to exceed a second threshold value, the processor is configured to identify a heated water draw event and determine a duration of the heated water draw event; and
determine, in real time, a volume of used heated water and an average flow rate of the water heating system using the duration of the heated water draw event.

2. The water heating system of claim 1, wherein the controller system is configured to determine a duration of a reheating event using the received inlet water temperature measurement.

3. The water heating system of claim 2, wherein:
the heating event is when water in the reservoir is heated after water has been drawn from the reservoir; and
the reheating event is when water in the reservoir is heated after the water in the reservoir has cooled during standby.

4. The water heating system of claim 1, wherein the controller system is configured to compensate the heated water temperature measurement using a compensation factor based on a configuration of the water heating system.

5. The water heating system of claim 4, wherein the compensation factor is determined based on a configuration of the T&P valve.

6. The water heating system of claim 1, wherein the processor is further configured to produce information on a volume of remaining available heated water in the reservoir.

7. The water heating system of claim 1, wherein the processor is further configured to calculate a standby loss factor of the water heating system.

8. The water heating system of claim 1, further comprising an electrical storage-style water heater.

9. A controller system for use in a storage-style water heater, the controller system comprising:
first and second sensors respectively attached to an inlet water pipe and a temperature and pressure (T&P) valve of the storage-style water heater, wherein the first and second sensors are configured to respectively measure and transmit inlet water pipe temperature measurements of the inlet water pipe and heated water temperature measurements of the T&P valve, respectively;
an energy meter configured to measure energy usage of the storage-style water heater; and
a processor configured to:
receive and monitor the inlet water pipe temperature measurements and the heated water temperature measurements;
detect an increase in the inlet water pipe temperature measurements;
determine a slope of the increase in the inlet water pipe temperature measurements, wherein when the slope is determined to exceed a threshold value, the processor is configured to identify a heating event and determine a duration of the heating event; and
derive, in real time, an amount of energy used for heating water based on the duration of the heating event.

10. The controller system of claim 9, wherein the processor is further configured to:
derive a volume of used heated water based on the duration of the heating event;
derive a usage profile of the storage-style water heater based on the volume of used heated water; and
reduce energy usage of the storage-type water heater based on the usage profile.

11. The controller system of claim 9, wherein the second sensor is configured to measure a temperature of an exterior surface of the T&P valve.

12. The controller system of claim 9, wherein when the slope is determined to exceed an other threshold value, the processor is configured to identify a reheating event and determine a duration of the reheating event.

13. A method of determining, in real time, a volume of used heated water in a storage-style water heater, wherein the storage-style water heater is connected to an inlet water pipe and a temperature and pressure (T&P) valve, the method comprising:
determining a thermal energy of the used heated water outputted by the storage-style water heater;
determining first and second temperature measurements of the inlet water pipe and the T&P valve, respectively;

detecting a decrease in the first temperature measurement;

determining a slope of the decrease in the first temperature measurement, wherein when the slope is determined to exceed a threshold value, the method further comprises identifying a heated water draw event and determining a duration of the heated water draw event; and deriving, in real time, the volume of the used heated water and a heated water flow rate based on the duration of the heated water draw event.

14. The method of claim 13, further comprising measuring an input energy supplied to the storage-style water heater based on the duration of the heated water draw event.

15. The method of claim 14, further comprising:
measuring a standby energy loss; and
determining a thermal energy output by subtracting the standby energy loss from the input energy.

16. The method of claim 13, further comprising creating a heated water usage profile based on the volume of the used heated water, wherein the heated water usage profile includes a volume of heated water remaining in the storage-style water heater after the used heated water has been outputted.

17. The method of claim 16, further comprising reducing energy usage of the storage-type water heater based on the heated water usage profile.

18. The method of claim 13, further comprising calculating a standby energy loss rate of the storage-style water heater.

19. The method of claim 13, further comprising calculating a flow rate of the storage-style water heater based on the first and second temperature measurements.

20. The method of claim 13, wherein determining the second temperature measurement comprises measuring a temperature of an exterior surface of the T&P valve of the storage-style water heater.

* * * * *